(12) United States Patent
Reineke et al.

(10) Patent No.: US 12,111,914 B2
(45) Date of Patent: Oct. 8, 2024

(54) TIMESERIES DCF CAPABILITIES TO PREDICT DATA INTERACTIONS BASED ON PAST TRENDS

(71) Applicant: Dell Products L.P., Round Rock, TX (US)

(72) Inventors: Nicole Reineke, Northborough, MA (US); Stephen J. Todd, North Andover, MA (US); Trevor Scott Conn, Leander, TX (US)

(73) Assignee: Dell Products L.P., Round Rock, TX (US)

( * ) Notice: Subject to any disclaimer, the term of this patent is extended or adjusted under 35 U.S.C. 154(b) by 196 days.

(21) Appl. No.: 17/652,209

(22) Filed: Feb. 23, 2022

(65) Prior Publication Data
US 2023/0267194 A1  Aug. 24, 2023

(51) Int. Cl.
*G06F 21/00* (2013.01)
*G06F 21/52* (2013.01)
*G06F 21/64* (2013.01)

(52) U.S. Cl.
CPC ........... *G06F 21/52* (2013.01); *G06F 21/64* (2013.01); *G06F 2221/033* (2013.01)

(58) Field of Classification Search
CPC ..... G06F 21/52; G06F 21/64; G06F 2221/033
See application file for complete search history.

(56) References Cited

U.S. PATENT DOCUMENTS

| | | | |
|---|---|---|---|
| 11,099,835 B1 | 8/2021 | Wall et al. | |
| 11,513,772 B1 | 11/2022 | Gross | |
| 2009/0196485 A1* | 8/2009 | Mueller | G06V 10/993 382/137 |
| 2018/0075194 A1 | 3/2018 | Allen et al. | |
| 2019/0103092 A1* | 4/2019 | Rusak | G06N 3/045 |
| 2019/0228262 A1* | 7/2019 | Gonzalez | A63F 13/65 |
| 2020/0287919 A1 | 9/2020 | Ravindranath et al. | |
| 2021/0014127 A1* | 1/2021 | Iyengar | H04L 41/069 |
| 2022/0043711 A1 | 2/2022 | Shemer et al. | |
| 2022/0043721 A1* | 2/2022 | Shemer | G06F 11/1484 |
| 2022/0100858 A1 | 3/2022 | Todd | |
| 2022/0291921 A1 | 9/2022 | Balasubramanian et al. | |
| 2022/0398308 A1 | 12/2022 | Zerah et al. | |
| 2023/0061701 A1 | 3/2023 | Shih et al. | |

OTHER PUBLICATIONS

Lawton, The future of trust will be built on data transparency, pp. 1-10, Mar. 2021.
Perez, Alvarium, pp. 1-2 (Year: 2021).
(Continued)

*Primary Examiner* — Ghazal B Shehni
(74) *Attorney, Agent, or Firm* — Workman Nydegger

(57) ABSTRACT

One example method is performed in connection with a data confidence fabric. This method includes generating information about data as the data transits a data confidence fabric, ingesting the information, mapping the ingested information to a timeline, evaluating the timeline, based on the evaluating, generating a recommendation for an action concerning the data, and implementing the action in the data confidence fabric. In this method, the evaluating includes determining if any unexpected time gaps occurred as the data transited the data confidence fabric.

18 Claims, 5 Drawing Sheets

(56) References Cited

OTHER PUBLICATIONS

Todd, Building the First Data Confidence Fabric, pp. 1-9 Oct. 2019.
Todd, Enterprise Trust Insertion and IoT, pp. 1-2, Aug. 5, 2019.
Todd, Information Playground: Edge Data and Trust Insertion, pp. 1-3, Sep. 18, 2019.
Todd, Information Playground: IoT Data Confidence Fabrics, pp. 1-3, May 30, 2019.
Todd, Project Alvarium: The Future of Edge Data, pp. 1-39 (Year: 2020).

* cited by examiner

TIMESERIES DCF CAPABILITIES TO PREDICT DATA INTERACTIONS BASED ON PAST TRENDS

FIELD OF THE INVENTION

Embodiments of the present invention generally relate to data behavior in a data confidence fabric. More particularly, at least some embodiments of the invention relate to systems, hardware, software, computer-readable media, and methods for assessing and predicting, based on past trends, data interactions in a DCF.

BACKGROUND

Human and machine data access processes often follow predictable paths. To illustrate, a data confidence fabric enables the association, such as by appending, of metadata to data as that data is generated and travels through the data confidence fabric to be used, ultimately, by an application that needs the data. The metadata may include trust insertion metadata that, in general, reflect the extent to which various data handling components in the data confidence fabric are assessed as being trustworthy or not. This metadata may be inserted by any or all of the components that handle the data as the data travels through the data confidence fabric. After the data has transited the data confidence fabric, an overall data confidence score may be calculated, based on the metadata that was annotated to the data, and the score then assigned to the data. Thus, the data confidence score constitutes an assessment of the data at a particular point in time, or within a constrained time frame.

However, even in environments such as a DCF, data access processes such as data handling and data movement are not necessarily controlled by a single pipeline, process, or entity. Moreover, a DCF may comprise a heterogenous distributed environment with a variety of different participating entities and possible data paths. Due to considerations such as these, and others, traditional data management paradigms are unable to predict and support data access processes, and processes to predict data interactions and data movement. Further, it may be difficult for an entity such as an enterprise to gain insight into suspicious activities, such as uncommon or unexplained data paths in the DCF. Finally, a typical DCF may be operational only at runtime at the application layer of the stack, so it may be difficult to gain insights about data behavior.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
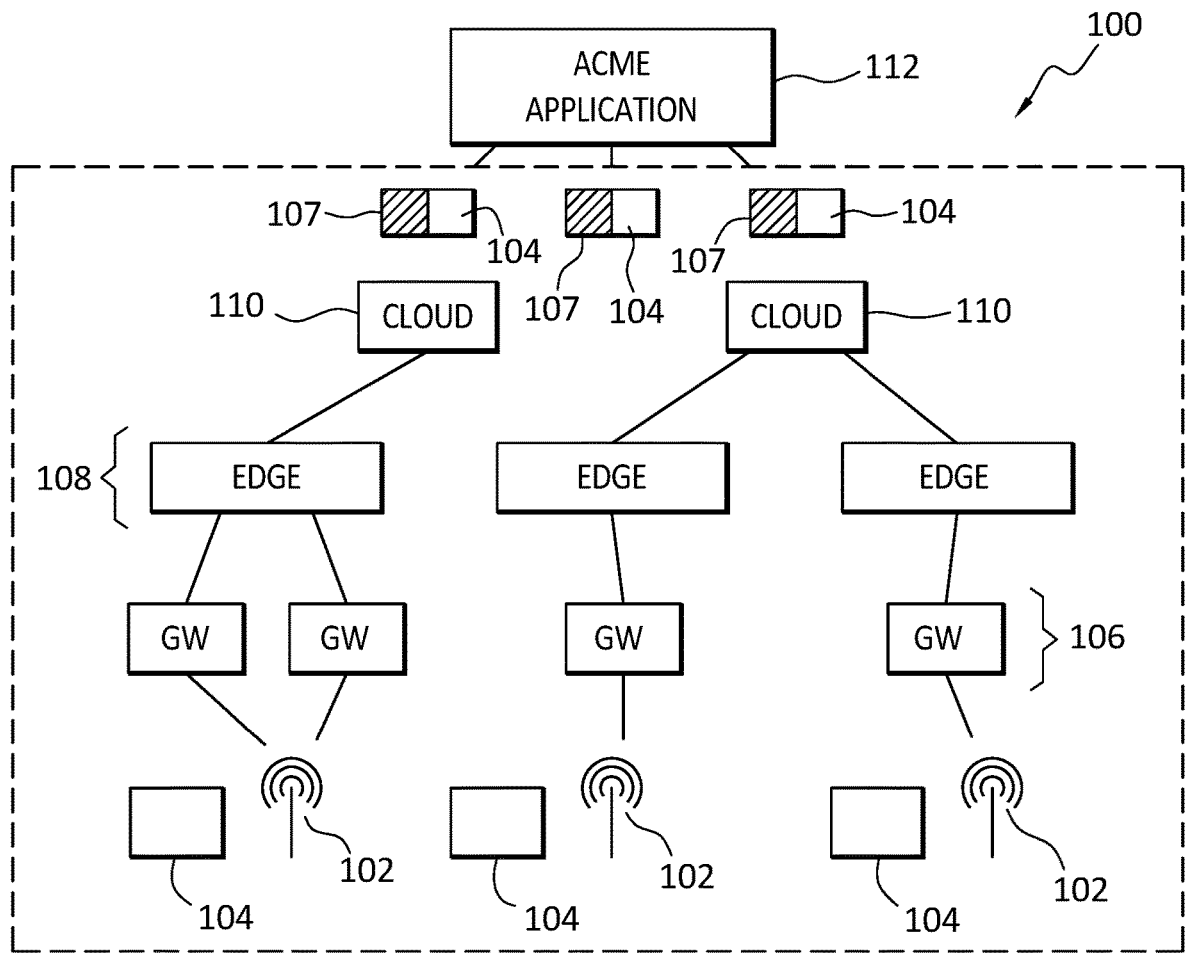
FIG. 1 discloses aspects of an example data confidence fabric (DCF).

Embodiments of the present invention generally relate to data behavior in a data confidence fabric. More particularly, at least some embodiments of the invention relate to systems, hardware, software, computer-readable media, and methods for assessing and predicting, based on past trends, data interactions in a DCF (Data Confidence Fabric).

In general, example embodiments of the invention may operate to lay out DCF information, such as confidence scores and confidence annotations for example, on a timeline to create what may be referred to herein as a 'timeseries view.' Due to this use of a timeline for mapping DCF information, at least some embodiments of a timeseries view may have a linear form. The DCF information, organized by the timeline, may then be used to identify, assess, and predict, data behavior as the data transits the DCF.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may make a determination as to the particular path, and DCF nodes, traversed by a piece of data as the data travels through the DCF, as well as the time(s) when that piece of data was at particular nodes of the DCF. In a related vein, an example embodiment may identify unexpected time gaps in the travel of data such as, for example, whether a piece of data took longer than expected to move from one node to another. As another example, an embodiment may make a determination as to whether or not a particular piece of data traveled an expected path in the DCF and, if not, a determination as to where the piece of data actually did travel and whether the nodes through which the data passed on the unexpected path are problematic for any reason. As a final example, an embodiment may determine a last known location of lost data, as well as the path traveled by that data to the last known location. Various other advantageous aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of an Example Operating Environment

The following is a discussion of aspects of example operating environments for various embodiments of the invention. This discussion is not intended to limit the scope of the invention, or the applicability of the embodiments, in any way.

With reference now to FIG. 1, some contextual and other information is provided concerning some example embodiments. In particular, FIG. 1 discloses a DCF 100 for a fictional company 'ACME.' The example DCF 100 may include one or more devices 102, such as IoT devices for example, that may be operable to collect and transmit data 104. The elements of the DCF, such as the devices 102, may be referred to individually or collectively as 'nodes.' The data from the devices 102 may be transmitted to a first level of the DCF that comprises one or more gateways 106. As shown, data 104 may be transmitted to multiple gateways 106. One or more of the gateways 106 may associate trust metadata 107 with the received data 104 in such a way that a relationship is established, and captured in some way, between the trust metadata 107 and the data 104. Association of the trust metadata 107 with the data 104 may be accomplished in various ways, including by appending the trust metadata to the data, or storing the trust metadata, such as in a ledger for example, in a way that associates the trust metadata 107 with the data 104. In this latter example, the trust metadata 107 may be stored separately from the data 104.

In the illustrative case of FIG. 1, the gateway 106 may then then pass the data 104, and possibly the trust metadata 107, to one or more edge devices 108 that collectively define a second level of the DCF 100. Alternatively, and as noted earlier, the trust metadata 107 may be associated with the data 104 in a way that does not necessarily involve appending the trust metadata 107 to the data 104.

One or more of the edge devices 108 may, in turn, insert additional trust metadata to create updated trust metadata 107 and then pass the data 104 and trust metadata 107 to a cloud environment such as a cloud computing site 110, from where an application 112 performing an application workload may access the data 104 and the trust metadata 107.

Thus, in FIG. 1, the raw device data 104 may flow through multiple levels of a generic hardware environment that has various levels of processing, memory, and storage capabilities. As the data 104 flows through the levels, DCF software running on each node may add provenance and trust metadata/scoring, collectively, the trust metadata 107, to the data 104. The application 112 may access the trust metadata 107 and use the trust metadata as a basis to measure and/or otherwise evaluate the trustworthiness of the data 104.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

B. Aspects of an Example Architecture

Figure 2:
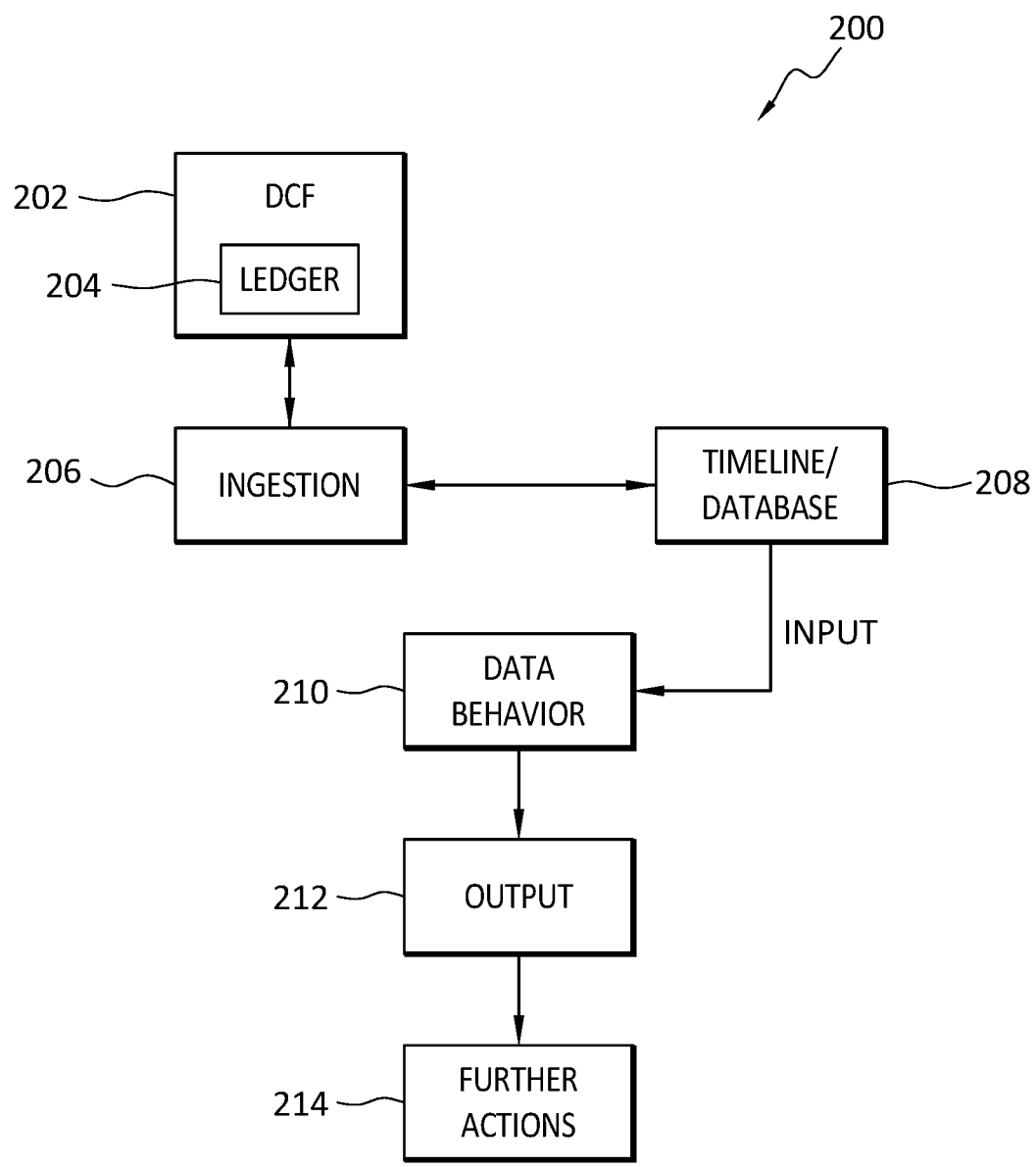
FIG. 2 discloses aspects of an example architecture according to some embodiments.

With reference now to FIG. 2, details are provided concerning an example architecture 200 according to some embodiments. As shown, a DCF 202, which may include, or be associated with, a ledger 204 holding data confidence scores and/or other data confidence information, may communicate with an ingestion module 206 which, in general, may operate to ingest, and/or otherwise obtain, information from the DCF 202, such as from one or more individual elements, or nodes, of the DCF 202, and/or from the ledger 204. This information obtained by the ingestion module 206 may include, but is not limited to, any information about the nature, movements, location, status, interactions, and other behavior and attributes, of data that has transited any portion of, or the entire, DCF 200. The information obtained by the ingestion module 206 need not take any particular form and, in some embodiments, that information may comprise, for example, data and/or metadata.

The ingestion module 206 may operate to organize the information obtained from the DCF 202 and ledger 204. In some embodiments at least, that information may be mapped onto a timeline 208 so that the information is organized according to when various events, relating to the data, took place. In practical terms, this mapping may comprise, for example, fetching DCF information into a time series DB (database). Example information that may be ingested and mapped may include, but is not limited to, dataPK (data primary key that uniquely identifies the data), datetime stamp, ActivityType (nature of activity(s) involving, or implicating, the data), UserID (owner of the data), location(s) (of the data), score(s) (data confidence scores).

The ingested and mapped DCF information may serve as input to a data behavior module 210 which may use the mapped DCF information to, for example, trace data lifecycles, data travel paths, and events involving the data, across assets, or nodes, of the DCF. These traces are one example of output 212 that may be generated by the data behavior module 210. Other example uses of the mapped DCF information are disclosed elsewhere herein. The output 212 generated by the data behavior module 210 may be used as a basis for implementing various further actions 214 such as, but not limited to, updating security procedures and protocols in a DCF when it is learned, for example, that a piece of data unexpectedly traveled to a particular node in the DCF, or was unexpectedly accessed by a particular entity in a DCF.

D. Operational Aspects of Some Example Embodiments

With the disclosure of FIGS. 1 and 2 in view, further details are now provided concerning operational aspects of some example embodiments. For example, through the use of a timeseries view, which may be obtained, for example, by the placement of annotations along a linear path for one or more pieces of data, and subsequent overlay of data with the same points of access or origin, embodiments may operate to identify trends of access and identify process paths that are unstated or otherwise unrecorded.

As well, through the use of these paths, embodiments may operate to assert predicted/expected interactions by data types, by users, and by specific assets, for example. Thus, embodiments may employ this approach to generate notifications when an unexpected chain of interaction, such as between different pieces of data in a DCF, and/or between a piece of data and an element of a DCF, is detected. These detected paths may be used in some embodiments as a secondary check to determine whether or not data should be used in near-real-time automation situations. In a secondary benefit, this information can also enable intelligent prefetching of data as embodiments may operate to predict the window of interaction and can schedule the prefetch for the lowest traffic period that still meets the typical next edit occurrence between assets.

In a further example, embodiments may operate to perform timeseries forecasting, possibly using a ML (Machine Learning) model. Particularly, such embodiments may use, as input to an ML model, historical information about the movements and interactions of data to enable the ML model to make predictions about future interactions and behavior of that data, and/or about other data. Such predictions may include, for example, predictions as to the path(s) expected to be traveled by the data, node(s) with which the data is expected to interact, other data or entities with which the data is expected to interact, and if/when/where the data is expected to be accessed by an entity such as a computing entity or node of a DCF, or an application, for example.

Thus, example embodiments may, among other things, apply DCF annotation capture, that is the capture of DCF information concerning data moving through a DCF, to a timeseries to predict the likelihood of the occurrences of processes, interactions, and access progression, involving the data. Further, example embodiments may, by mapping DCF information into a timeseries form, enable the identification of an unexpected data progression within the DCF and, accordingly, facilitate the development and implementation of security procedures to help avoid future unexpected data progression, that is, unexpected DCF data paths traveled by the data, that could compromise the data in some way.

E. Aspects of an Example Use Case

Figure 3:
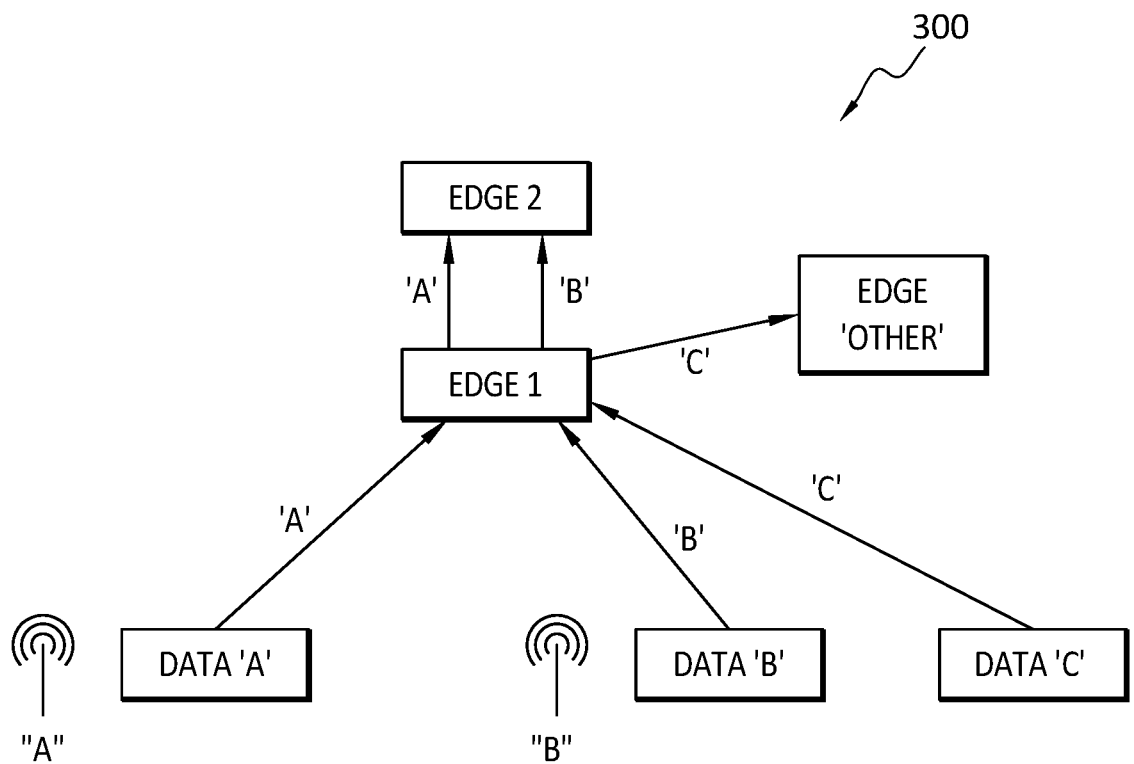
FIG. 3 discloses aspects of an example use case according to one embodiment.

With reference now to FIG. 3, details are provided concerning an example use case for some embodiments. In a distributed environment, such as a DCF 300, sensors A and B are members of a mine detection system. As shown, DataA is generated on sensor A, and registered with the DCF 300. This DataA is then accessed on edge1, resulting in an update to the information in the DCF 300, such as to a ledger of the DCF 300, to indicate the access, and then sent by edge1 to edge2, which results in another update to the DCF 300 information to show the path of DataA. Further, DataB is generated on sensor B, and registered with the DCF 300. This DataB is then accessed on edge1, causing an update to the DCF 300 information, and then sent from edge1 to edge2, which causes a corresponding update to the DCF 300. Thus, as data is added to the timeseries, a pattern is established that sensor DataA and DataB are typically accessed first by edge1, and then by edge2.

With continued reference to FIG. 3, DataC is generated on sensor B, and registered with the DCF 300. This DataC is then accessed on edge1, and that access reflected in an update to the DCF 300 information. DataC is then sent from edge1 to edge_OTHER, which causes a corresponding update to the DCF 300. In this example, the timeseries service plots dataC as sensor B data, and determines that typical data access and travel patterns, for data originating from sensor B, do not include edge_OTHER. Because this pattern is out of the norm for data from sensor B, a notification may be sent, by the DCF 300 for example, to an administrator or other entity, indicating that an abnormal data pattern has been observed and recorded.

Based on the information included in the notification, an administrator may perform an investigation concerning DataC, and based on that investigation, may generate and implement new/modified procedures concerning the handling of data in the DCF 300, such as to prevent future access by edge_OTHER to data generated by sensor B or, more generally, to prevent future access by edge_OTHER to data transmitted to edge1. The foregoing is presented only by way of example, and various other actions may be taken based on an investigation that may have been triggered, for example, by an unusual data access/travel pattern.

In a secondary use case, which may relate to that just described, data that is similar in some regard, such as data type to DataC and/or data that shares a common asset UserID with DataC, may be identified. This other data may also be evaluated so as to identify outliers for use in identifying high priority data, data at risk, or simply data that should remain in working memory. For example, a new/updated security protocol may be implemented for this other similar data, which may or may not have yet been generated, so that it does not travel to edge_OTHER. In some embodiments, a new/updated data handling profile may be generated that may be applied to data, which may be as yet un-generated, so that this data, whether new, existing, or not yet generated, is prevented from being accessed at edge_OTHER.

F. Example Methods

Figure 4:
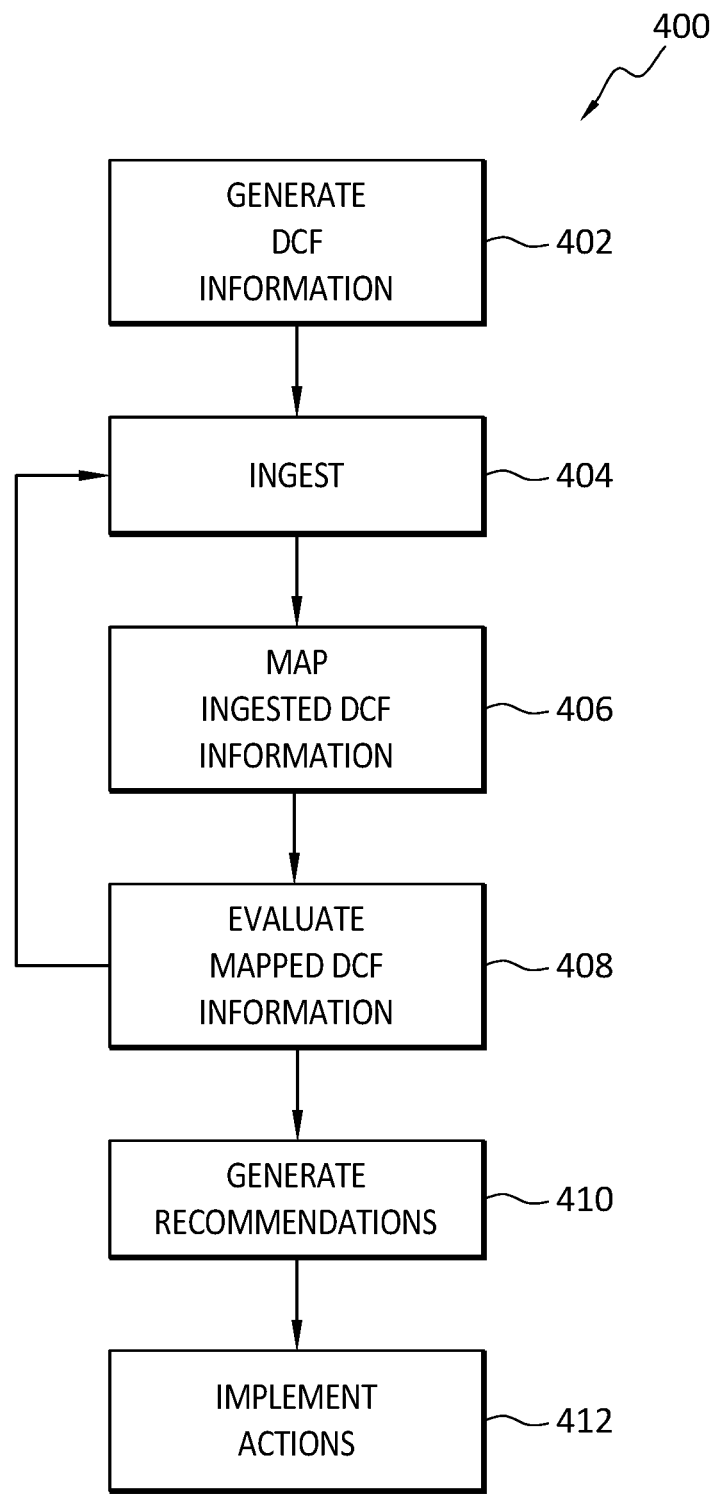
FIG. 4 discloses aspects of an example method according to some embodiments.

It is noted with respect to the disclosed methods, including the example method of FIG. 4, that any operation(s) of any of these methods, may be performed in response to, as a result of, and/or based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 4, details are provided concerning an example method 400 according to some embodiments. Part or all of the method 400 may be performed cooperatively by a platform that comprises an ingestion module and a data behavior module, although no particular components or entities are required to perform any particular portion(s) of the method 400.

Initially, a DCF may generate information 402, such as, but not limited to, data confidence annotations, information about data movement and travel paths in the DCF, information about data interactions with nodes of the DCF, and information about actual or attempted access of the data in the DCF. This information may be stored, for example, in a ledger of the DCF and/or elsewhere, such as in a database accessible by the DCF.

After the DCF information has been generated 402, the DCF information may be ingested 404 for further processing, such as by a platform that is operable to perform a mapping operation. Particularly, the ingested DCF information may be mapped 406 to a timeline, and the results of the mapping evaluated 408. Based on the outcome of the evaluation 408, one or more recommendations may be generated 410, and corresponding actions may then be implemented 412.

Note that in some embodiments, the ingestion 404 and mapping 406 may occur in real-time as, or immediately after, the DCF information is generated 402. For example, the DCF information may be streamed to a platform for ingestion and mapping. In other embodiments, mapping 406 may be delayed until particular data of interest has transited a specified portion of the DCF, or until that particular data has transited the entire DCF. As this example illustrates, the example operations of the method 400 need not necessarily be performed in the particular order indicated in FIG. 4.

G. Further Example Embodiments

Following are some further example embodiments of the invention. These are presented only by way of example and are not intended to limit the scope of the invention in any way.

Embodiment 1. A method, comprising: generating information about data as the data transits a data confidence fabric; ingesting the information; mapping the ingested information to a timeline; evaluating the timeline; based on the evaluating, generating a recommendation for an action concerning the data; and implementing the action in the data confidence fabric.

Embodiment 2. The method as recited in embodiment 1, wherein the information comprises information about a path traveled by the data in the data confidence fabric.

Embodiment 3. The method as recited any of embodiments 1-2, wherein the information comprises information about accesses, and access attempts, of the data.

Embodiment 4. The method as recited any of embodiments 1-3, wherein the information comprises information about a lifecycle of the data.

Embodiment 5. The method as recited any of embodiments 1-4, wherein the evaluating comprises identifying an unexpected event that has occurred involving the data as the data transited the data confidence fabric.

Embodiment 6. The method as recited any of embodiments 1-5, wherein the evaluating comprises determining if any unexpected time gaps, during which the data was not being tracked, occurred as the data transited the data confidence fabric.

Embodiment 7. The method as recited any of embodiments 1-6, wherein the information comprises a data primary key, a date time stamp, a nature of an activity involving the data, a user identifier, a location of the data, and data confidence score.

Embodiment 8. The method as recited any of embodiments 1-7, wherein the evaluating comprises identifying a trend of access of the data, by nodes of the data confidence fabric, as the data transited the data confidence fabric.

Embodiment 9. The method as recited any of embodiments 1-8, further comprising, based on the evaluating, generating a prediction as to an expected interaction for other data.

Embodiment 10. The method as recited any of embodiments 1-9, wherein the evaluating comprises identifying a process path of the data through the data confidence fabric.

Embodiment 11. A system for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
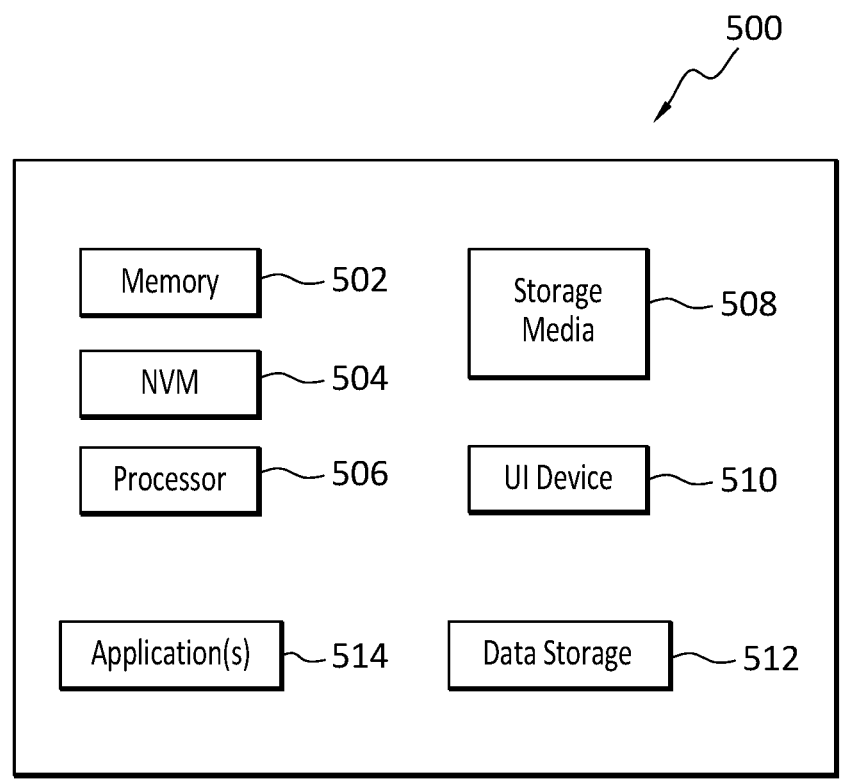
FIG. 5 discloses aspects of an example computing entity operable to perform any of the disclosed methods, processes, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
   generating information about data as the data transits a data confidence fabric;
   ingesting the information;
   mapping the ingested information to a timeline;
   evaluating the timeline;
   based on the evaluating, generating a recommendation for an action concerning the data; and
   implementing the action in the data confidence fabric,
   wherein the evaluating comprises determining if any unexpected time gaps, during which the data was not being tracked, occurred as the data transited the data confidence fabric.

2. The method as recited in claim 1, wherein the information comprises information about a path traveled by the data in the data confidence fabric.

3. The method as recited in claim 1, wherein the information comprises information about accesses, and access attempts, of the data.

4. The method as recited in claim 1, wherein the information comprises information about a lifecycle of the data.

5. The method as recited in claim 1, wherein the evaluating comprises identifying an unexpected event that has occurred involving the data as the data transited the data confidence fabric.

6. A method comprising:
   generating information about data as the data transits a data confidence fabric;
   ingesting the information;
   mapping the ingested information to a timeline;
   evaluating the timeline;
   based on the evaluating, generating a recommendation for an action concerning the data; and
   implementing the action in the data confidence fabric,
   wherein the information comprises a data primary key, a date time stamp, a nature of an activity involving the data, a user identifier, a location of the data, and data confidence score.

7. The method as recited in claim 1, wherein the evaluating comprises identifying a trend of access of the data, by nodes of the data confidence fabric, as the data transited the data confidence fabric.

8. The method as recited in claim 1, further comprising, based on the evaluating, generating a prediction as to an expected interaction for other data.

9. The method as recited in claim 1, wherein the evaluating comprises identifying a process path of the data through the data confidence fabric.

10. A non-transitory storage medium having stored therein instructions that are executable by one or more hardware processors to perform operations comprising:
    generating information about data as the data transits a data confidence fabric;
    ingesting the information;
    mapping the ingested information to a timeline;
    evaluating the timeline;
    based on the evaluating, generating a recommendation for an action concerning the data; and
    implementing the action in the data confidence fabric, wherein the evaluating comprises determining if any unexpected time gaps, during which the data was not being tracked, occurred as the data transited the data confidence fabric.

11. The non-transitory storage medium as recited in claim 10, wherein the information comprises information about a path traveled by the data in the data confidence fabric.

12. The non-transitory storage medium as recited in claim 10, wherein the information comprises information about accesses, and access attempts, of the data.

13. The non-transitory storage medium as recited in claim 10, wherein the information comprises information about a lifecycle of the data.

14. The non-transitory storage medium as recited in claim 10, wherein the evaluating comprises identifying an unexpected event that has occurred involving the data as the data transited the data confidence fabric.

15. The non-transitory storage medium as recited in claim 10, wherein the information comprises a data primary key, a date time stamp, a nature of an activity involving the data, a user identifier, a location of the data, and data confidence score.

16. The non-transitory storage medium as recited in claim 10, wherein the evaluating comprises identifying a trend of access of the data, by nodes of the data confidence fabric, as the data transited the data confidence fabric.

17. The non-transitory storage medium as recited in claim 10, further comprising, based on the evaluating, generating a prediction as to an expected interaction for other data.

18. The non-transitory storage medium as recited in claim 10, wherein the evaluating comprises identifying a process path of the data through the data confidence fabric.

* * * * *